United States Patent
Von Trotha et al.

(10) Patent No.: US 8,904,970 B2
(45) Date of Patent: Dec. 9, 2014

(54) METHOD AND DEVICE FOR PRODUCING PROCESS VAPOR AND BOILER FEED STEAM IN A HEATABLE REFORMING REACTOR FOR PRODUCING SYNTHESIS GAS

(75) Inventors: Thilo Von Trotha, Selm (DE); Jan Heinrich, Baierbrunn/Buchenhain (DE)

(73) Assignee: Thyssenkrupp UHDE GmbH, Dortmund (DE)

( * ) Notice: Subject to any disclaimer, the term of this patent is extended or adjusted under 35 U.S.C. 154(b) by 31 days.

(21) Appl. No.: 13/821,976

(22) PCT Filed: Aug. 20, 2011

(86) PCT No.: PCT/EP2011/004205
§ 371 (c)(1),
(2), (4) Date: May 8, 2013

(87) PCT Pub. No.: WO2012/031683
PCT Pub. Date: Mar. 15, 2012

(65) Prior Publication Data
US 2013/0213489 A1    Aug. 22, 2013

(30) Foreign Application Priority Data
Sep. 10, 2010    (DE) .......................... 10 2010 044 939

(51) Int. Cl.
| | |
|---|---|
| C10J 3/00 | (2006.01) |
| C01B 3/38 | (2006.01) |
| F22B 1/18 | (2006.01) |
| C01B 3/34 | (2006.01) |
| F22D 1/02 | (2006.01) |
| F01K 23/10 | (2006.01) |
| C01B 3/48 | (2006.01) |

(52) U.S. Cl.
CPC ....... *F22B 1/1838* (2013.01); *C01B 2203/0811* (2013.01); *C01B 2203/0883* (2013.01); *C01B 2203/047* (2013.01); *C01B 2203/04* (2013.01); *C01B 3/384* (2013.01); *C01B 3/34* (2013.01); *C01B 2203/0283* (2013.01); *F22D 1/02* (2013.01); *F01K 23/10* (2013.01); *C01B 2203/0894* (2013.01); *C01B 3/48* (2013.01); *C01B 2203/0205* (2013.01)
USPC ............................ 122/1 R; 48/197 R; 48/204

(58) Field of Classification Search
CPC .................................................. C01B 2203/0205
USPC .................... 122/7 R; 48/197 R, 204, 202
See application file for complete search history.

(56) References Cited

U.S. PATENT DOCUMENTS

| | | | |
|---|---|---|---|
| 3,361,534 A | 1/1968 | Johnson et al. | |
| 4,725,380 A * | 2/1988 | Pinto ............................ | 252/376 |

(Continued)

FOREIGN PATENT DOCUMENTS

| | | |
|---|---|---|
| EP | 1849748 | 10/2007 |
| EP | 2103568 | 9/2009 |

(Continued)

OTHER PUBLICATIONS

International Search Report for PCT/EP2011/004205, English translation attached to original, Both completed by the European Patent Office on Feb. 13, 2012, All together 7 Pages.

*Primary Examiner* — Gregory A Wilson
(74) *Attorney, Agent, or Firm* — Brooks Kushman P.C.

(57) ABSTRACT

A method for producing process vapor and boiler feed steam in a heatable reforming reactor for producing synthesis gas. The sensible heat of a synthesis gas produced from hydrocarbons and steam can be used so that two types of vapor are produced during the heating and evaporation of boiler feed water and process condensate. The method also includes a conversion of the carbon monoxide contained in the synthesis gas. The method includes an optional heating of the boiler feed water using the flue gas from the heating of the reforming reactor. The sensible heat of the synthesis gas and of the flue gas originating from the heating can be used more efficiently. The disadvantages from the flue gas heating, which are caused by the fluctuating heat supply in the flue gas duct, are avoided. A system for practicing the method is also disclosed.

14 Claims, 3 Drawing Sheets

(56) References Cited

U.S. PATENT DOCUMENTS

| | | |
|---|---|---|
| 7,572,363 B2 | 8/2009 | Freitag et al. |
| 8,617,270 B2 * | 12/2013 | Haque .......................... 48/197 R |
| 2003/0110694 A1 * | 6/2003 | Drnevich et al. ............ 48/198.5 |
| 2005/0288381 A1 | 12/2005 | Marrella et al. |
| 2009/0232729 A1 | 9/2009 | Genkin et al. |
| 2009/0242841 A1 | 10/2009 | Judas et al. |
| 2010/0223839 A1 * | 9/2010 | Garcia-Perez et al. ......... 44/313 |
| 2010/0301273 A1 * | 12/2010 | Blasiak et al. ................ 252/373 |
| 2011/0277962 A1 | 11/2011 | Von Trotha |
| 2012/0195817 A1 * | 8/2012 | Singh et al. ................... 423/360 |
| 2013/0009102 A1 * | 1/2013 | Kelly et al. ................... 252/373 |

FOREIGN PATENT DOCUMENTS

| | | |
|---|---|---|
| FR | 2892496 | 7/2007 |
| WO | 2010051900 | 5/2010 |

* cited by examiner

METHOD AND DEVICE FOR PRODUCING PROCESS VAPOR AND BOILER FEED STEAM IN A HEATABLE REFORMING REACTOR FOR PRODUCING SYNTHESIS GAS

CROSS-REFERENCE TO RELATED APPLICATIONS

This application is the U.S. national phase of PCT Appln. No. PCT/EP2011/004205 filed on Aug. 20, 2011, which claims priority to Germany Patent Application No. 10 2010 0044 939.3 filed on Sep. 10, 2010, the disclosures of which are incorporated in their entirety by refernce herein.

BACKGROUND OF THE INVENTION

1. Field of the Invention

The invention relates to a process for the generation of process steam and boiler feed water steam in a heatable reforming reactor for the production of syngas. The inventive process serves to exploit the sensible heat of a syngas produced from hydrocarbons and steam so to obtain two types of steam, each being generated when heating and evaporating boiler feed water and process condensate, with the process also including a conversion of the carbon monoxide contained in the syngas, and with the process including optional heating of the boiler feed water by means of the flue gas obtained from the heating of the reforming reactor. The process allows exploiting the sensible heat of the syngas and the flue gas from the heating more efficiently, while avoiding the disadvantages of the flue gas heating on account of the varying amounts of heat available in the flue gas duct. The invention also relates to a contrivance for carrying out this process.

2. Description of the Related Art

Syngas can, for example, be generated by the catalytic conversion of gaseous or evaporated hydrocarbons by means of steam in a heatable reforming reactor, heating being carried out by combusting a fuel gas with an oxygenous gas. Upon generation the syngas has a temperature of approx. 800° C. to approx. 900° C. The sensible heat of the obtained syngas can thus be used for steam generation. Heating yields a flue gas which also carries sensible heat and can equally be used for steam generation. The steam can, in turn, be used for operating auxiliary units or a steam turbine.

For steam generation the process condensate can be used as feed water, which is condensed water forming when the syngas is cooled. This process condensate, however, involves the disadvantage that it contains the same impurities contained in the syngas. Such impurities are frequently of unwanted corrosive effect so that the steam is not unlimitedly suitable for all applications. This steam is thus usually employed as starting steam in the reforming reaction.

In addition, the amount of steam obtained from the process condensate is usually not enough to operate all secondary units which frequently require a constant amount of steam. To solve the problem, additional steam can be generated from clean boiler feed water. Such steam does not contain any impurities so that it meets the strict requirements to be fulfilled by the operation of steam turbines. Hence two types of steam are obtained.

Operation of two steam systems involves great advantages. It is possible to mix the steam from the process condensate with, for example, steam from the boiler water to ensure the availability of a sufficient amount of steam for the syngas production or to influence the steam composition according to the purity required for the process or the downstream application.

The steam obtained from the boiler feed water cannot only be used for the operation of auxiliary units or steam turbines but can also be exported or used as feed steam for the generation of syngas. The steam from the boiler feed water can, for example, be generated by heating the boiler feed water with the process gas, which is freshly produced syngas of high temperature. Analogously, the steam from the process condensate, which is water condensed from the syngas, can be generated by heating the process condensate with syngas. Here, the typical procedure is to heat the boiler feed water or the process condensate in a pre-heater designed as heat exchanger and then to evaporate the heated water in a steam generator. The steam generator can, for example, be designed as a steam drum which is heated by the syngas via fluid-conveying heat exchanger coils.

WO 2010051900 A1 teaches a process and a contrivance for the utilisation of heat in the steam reformation of hydrocarbonaceous feedstocks by means of steam, in which a steam reformer is used to generate a syngas which carries an amount of heat, including at least six heat exchangers, a water treatment unit, a cooling section, a high-temperature conversion unit, at least two pressure-boosting units, at least one consumer and at least one unit for further processing of the syngas obtained, with the generated syngas carrying the first amount of heat passing the high-temperature conversion unit, where its major part is converted to carbon dioxide and hydrogen, and the resulting heat-carrying syngas being routed into a first heat exchanger for further heat transfer, then passing through at least two more heat exchangers which are operated as boiler feed water pre-heaters, product condensate heat exchangers or low-pressure evaporators and are connected in series in any order desired, the syngas resulting from the low-pressure evaporator first being routed to another boiler feed water pre-heater in which heat energy is transferred to a partial stream of the boiler feed water from the water treatment unit, the resulting syngas subsequently passing the cooling section where the syngas is further cooled and a condensate flow produced, and the resulting syngas being finally passed through at least one unit for further processing. The process does not teach any possibility to exploit the heat of the syngas upstream of the high-temperature conversion unit.

To generate the steam from the process condensate, it is also possible to use the sensible heat of the flue gas. US 2009242841 A1 teaches a process for the generation of syngas in which the syngas is generated by steam reforming in a reforming reactor, with a combustion air flow, a convection zone and a flue gas stream and the process including the process step of combustion air passage through a preliminary heat exchanger system in the convection zone in order to heat the combustion air in indirect heat exchange with the flue gas, with the temperature of the pre-heated combustion air ranging between approx. 93° C. (200° F.) and 204° C. (400° F.). According to an embodiment of the process, boiler feed water is heated by passing it through the syngas cooling section and the combustion air convection zone after or in parallel to the combustion air to be heated, the convection zone being heated by the flue gas stream.

To heat the boiler feed water or the process condensate by the flue gas, it is usually necessary for part-load operation to adapt the heat amount available in the flue gas duct at constant mass flow of process condensate or boiler feed water in order to ensure evaporation of the water. This means that an additional amount of heat is to be provided at least temporarily by means of auxiliary burners, for example. This involves increased operating cost.

As the dual steam system, however, involves the aforementioned advantages, possibilities are explored to achieve further improvements. A starting point for improving the efficiency of the dual steam system is to bypass the heat exchanger in the flue gas duct for the period of time during which there is not enough heat available in the flue gas duct. In this way, there is no need to operate additional burners for heating the flue gas duct.

It is possible to heat the process condensate by the waste heat of the flue gas duct. However, as the process condensate is usually not cooled down to the temperatures of the cool boiler feed water, its temperature is higher than that of the cool boiler feed water. Owing to the lower temperature difference to the flue gas, the heat exchangers for the process condensate in the flue gas duct thus require larger heat exchanging surfaces according to Newton's law of cooling. As the temperature difference between the process condensate and the hot syngas is higher, significantly smaller heat exchanging surfaces are required in the process gas line downstream the reforming reactor than in the flue gas duct. As the water-gas shift reaction additionally takes place at considerably lower temperatures than the syngas production, the heat of the syngas production can be used more efficiently for the process condensate right after the discharge from the reforming reactor where the temperature is significantly higher than downstream of the conversion unit. Smaller-sized heat exchanging surfaces, in turn, will contribute to an improved cost-effectiveness of the process.

SUMMARY OF THE INVENTION

It is therefore the aim to provide a process which exploits the heat of the syngas upstream of the carbon monoxide conversion to evaporate the process condensate. Another aim of the process is to reduce the dependency from the varying amounts of heat available in the flue gas duct. These measures serve to continue using the advantages of the dual steam system and to improve the cost-effectiveness of the steam generation in reforming reactors.

The invention achieves this aim by a process which uses an additional steam generator installed upstream of the carbon monoxide conversion unit for generating steam from process condensate. As the generation of steam from boiler feed water upstream of the conversion unit is already in operation, it is suitable to also generate steam from process condensate in the same place. Thus it is possible to replace a permanent generation of steam from process condensate by the flue gas duct.

DETAILED DESCRIPTION OF THE INVENTION

Cooling of the process gas from the reformer outlet to the inlet temperature of the water-gas shift reaction has up to now typically resulted in the evaporation of boiler feed water. Other examples show that part of the heat is also used for the pre-heating of feedstock. Thus the natural gas or the feed gas mixture, for example, can be used for the reforming reaction. Now, according to the present invention, process condensate is additionally evaporated between reformer outlet and inlet of the water-gas shift reaction. Thus it is advantageously achieved to evaporate process condensate by process gas. In this way it is possible to give up evaporation of the process condensate in the flue gas duct completely or in part. As the temperature difference between the process condensate and the hot syngas upstream of the CO conversion unit is relatively high, the heat exchanging surfaces required will be of significantly smaller size than in the flue gas duct. This will in turn contribute to an improved cost-effectiveness of the process.

Prior to heating the process condensate in the flue gas duct, it is of advantage to heat the boiler feed water as this is cooler and, due to the smaller heat exchanging surfaces, requires less contact surface with the corrosive syngas. This will also contribute to an improved cost-effectiveness of the process.

Depending on the utilisation degree of the contrivance, the flue gas duct can be used for the generation of steam from boiler feed water. In doing so, the heat transfer of the flue gas can be by-passed. For this purpose, the coils conveying the boiler feed water through the flue gas duct are by-passed for the time when an insufficient amount of heat is available in the flue gas duct. In this way it is possible to use a lower-cost heat exchanger in the flue gas duct, as smaller heat exchanging surfaces are required when economical heating is no longer possible due to the temperature differences in the flue gas duct. In this way it is also possible to heat part of the boiler feed water or additional boiler feed water in the flue gas duct. The use of cold boiler feed water allows more efficient heat exchange owing to the higher temperature difference to the flue gas.

Especially claimed is a process for the generation of process steam and boiler feed water steam in a heatable reforming reactor for the production of syngas, with
  the process yielding syngas by steam reforming from hydrocarbons and water vapour, the gas being heated by incinerating a fuel gas with an oxygenous gas, and the generated syngas being cooled and then condensed by a series of heat exchangers and a cooling section, so that a dried syngas and a process condensate are obtained, and
  the process also including a conversion of at least part of the obtained carbon monoxide with water vapour to form carbon dioxide and hydrogen, and
  two different types of steam being made available, which are generated from the evaporation of boiler feed water and the evaporation of process condensate, and
  the boiler feed water being heated with the syngas by a pre-heater installed downstream of the conversion unit in direction of the gas flow, and the boiler feed water then being evaporated by a steam generator installed upstream of the conversion unit in direction of the gas flow, and
  the process condensate being heated by a heat exchanger and a pre-heater, both being installed downstream of the conversion unit in direction of the gas flow,
  and which is characterised in that
  the process condensate is evaporated by an additional steam generator installed upstream of the conversion unit.

To ensure that the flue gas can also be exploited for heating the boiler feed water, the line for the liquid boiler feed water can be led through the flue gas duct, the boiler feed water being heated permanently or temporarily by the flue gas via an additional heat exchanger. For this purpose, diverter valves are installed in the feed line for the boiler feed water in the heat exchangers of the flue gas duct. These diverter valves allow by-passing of the heat exchanger if, for example, there is not enough heat available in the flue gas duct.

As the cost-effectiveness of the process mainly depends on the adjustment of the steam yield to the steam demand, it is possible to control the yield of all steam generators in the system in an advantageous embodiment of the process. This can be achieved, for example, by controlling the steam yield from boiler feed water via a temperature control of the steam generator for boiler feed water. This can also be achieved, however, by controlling the heat circulation in the steam generator by valves or pumps.

The steam yield from process condensate can also be controlled in an advantageous embodiment of the process. This can equally be achieved by controlling the steam yield from process condensate via a temperature control of the steam generator for process condensate. This can also be achieved, however, by controlling the heat circulation in the steam generator by valves or pumps. It is, however, more difficult to implement a control of the steam yield from process condensate as the available amount of process condensate is coupled to the production of syngas.

In another embodiment of the inventive process it is also possible to control both the steam yield from boiler feed water and the steam yield from process condensate via temperature control of the steam generators. It goes without saying that both steam types can be mixed or blended with each other according to the requirements.

The two steam generators for the boiler feed water and the process condensate downstream of the reforming reactor in flow direction of the syngas can be fitted with by-pass pipelines allowing control of the syngas flow via the steam generators. It is also possible to provide additional heat exchangers for the hydrocarbonaceous starting mixture to be heated for the reforming reactor upstream or directly downstream of the CO conversion unit.

The configuration of the process can further include to provide a kettle reboiler as a steam generator for process condensate upstream of the CO conversion unit. The configuration can further include that the heat exchanger for process condensate downstream of the water-gas shift reaction is a kettle reboiler. This is a means to control the temperature of the syngas. It is also possible to pass the syngas flow upstream and downstream of the CO conversion unit through a single kettle reboiler with integral coils. In this way the process condensate evaporation can be arranged with minimum space requirements. The use of the individual kettle reboilers and the determination of the related operating periods are left to the discretion of the specialist skilled in the art. In this way it is possible to implement a temperature control for the syngas flow which is independent of the flue gas and syngas production. It goes without saying that syngas may also include a gas of high hydrogen content depending on the degree of CO conversion.

Also claimed is a contrivance which serves to run the process described. Especially claimed is a contrivance for the generation of process steam and boiler feed water steam in a heatable reforming reactor for the production of syngas, including     a heatable reforming reactor for the production of syngas from hydrocarbons and water vapour,     a conversion unit for converting carbon monoxide with water vapour into carbon dioxide,     a cooling section for condensing process water,     two pre-heaters for heating the boiler feed water and the process condensate with syngas,     an additional heat exchanger for heating the process condensate with syngas, the heat exchanger being installed directly downstream of the conversion unit in direction of the syngas flow,     a steam generator installed upstream of the conversion unit in direction of the syngas flow, this generator being used for the generation of steam from boiler feed water, and which is characterised in that     the contrivance comprises a steam generator installed upstream of the conversion unit in direction of the syngas flow, this generator being used to generate steam from process condensate.

The contrivance can be equipped with an additional heat exchanger for heating boiler feed water in the flue gas duct. In this fashion, the flue gas duct can also be used for heating boiler feed water. According to an embodiment of the invention this duct can be shut off so that the boiler feed water can flow into the specified steam generator directly and without flowing through the flue gas duct. In this manner it is possible to by-pass the heat exchanger in the flue gas duct and to keep the flow from passing through the duct. The boiler feed water will then flow directly into the specified steam generator.

The steam generators can be of a design commonly used according to the state of the art. In an exemplary embodiment they can be designed as a steam drum heated with the gas via heat exchanger coils. The steam generator can be designed as standard steam boiler with natural circulation or equipped with convection units, pumps or reboilers.

In an embodiment of the invention the syngas line is provided with a pipeline that can be shut off and allows controllable by-pass of the steam generator for the boiler feed water upstream of the CO conversion unit in direction of the gas flow (by-pass pipeline). It is thereby possible to control the portion of syngas led through the heat exchanger for the boiler feed water. In another embodiment of the invention the syngas line is provided with a pipeline that can be shut off and allows controllable by-pass of the steam generator for the process condensate upstream of the CO conversion unit in direction of the gas flow. It is thereby possible to control the portion of syngas led through the heat exchanger for the process condensate. It is also possible to install and use both by-pass lines.

The steam generators for boiler feed water and process condensate can be exchangeable, although a preferred embodiment provides that the steam generator for boiler feed water be installed directly downstream of the reforming reactor.

According to an embodiment of the invention, the steam generator in the syngas line upstream of the CO conversion unit is a kettle reboiler. According to another embodiment, the heat exchanger in the syngas line downstream of the CO conversion unit is a kettle reboiler. It is, however, also possible to provide the syngas line with kettle reboilers upstream as well as downstream of the CO conversion unit. It is also possible to use a kettle reboiler with heat exchanger coils which provide for a passage of the syngas upstream as well as downstream of the CO conversion unit in direction of the gas flow. In such a kettle reboiler the syngas is heated simultaneously upstream and downstream of the CO conversion unit. In such case the steam drum for the process condensate can be omitted in an exemplary manner. It is also possible to provide multiple kettle reboilers in the aforementioned arrangements. The kettle reboiler/s or reboiler/s can be provided as single or multiple units. Kettle reboilers are known according to the state of the art and have become commonly used boiler or reboiler versions.

According to a further possible embodiment of the invention, both steam generators for the generation of steam from boiler feed water and process condensate can be controlled in terms of temperature. This can be implemented by optional devices. The plant typically also includes pre-heaters for the boiler feed water and the process condensate. These are typically designed as heat exchangers and can also be provided in optional number and order.

According to a further embodiment, a unit for low-temperature CO conversion by water-gas shift reaction is installed between the pre-heaters for the boiler feed water and the process condensate with syngas in order to additionally exploit the reaction heat of this CO conversion.

In addition, the inventive contrivance can include components at any point that are required for normal operation of a steam reforming reactor. These are, for instance, heaters, thermostats, coolers, compressors, pressure reducers, pressure-relief devices or pumps. Such plant components are known to the specialist skilled in the fabrication of such equipment.

The invention involves the advantage that the sensible heat of a syngas can also be exploited upstream of a high-temperature conversion unit for carbon monoxide of a steam reforming reactor. The invention involves the additional advantage that, while maintaining the dual steam system, steam from boiler feed water can be provided, which is heated by both syngas and flue gas from the heating, as well as from process condensate, without any need for adjustment of the amount of heat in the flue gas duct. This ensures more independence from the consumers of steam with regard to the amount of steam consumed.

The invention is illustrated by means of three drawings.

Figure 1:
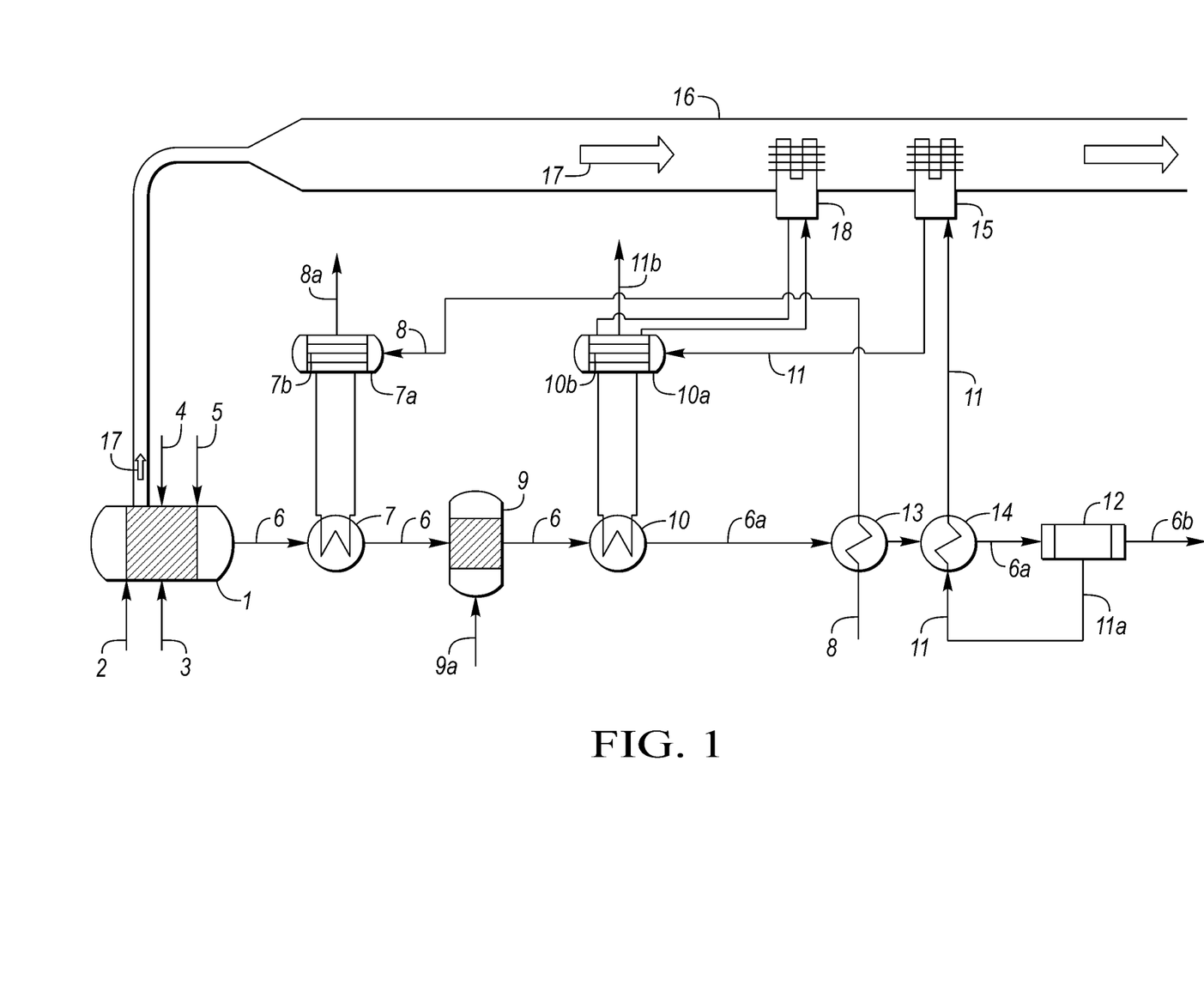
FIG. 1 shows a plant with a state-of-the-art process flow.

FIG. 1 shows a contrivance according to the state of the art including a reforming reactor (1) for steam reforming of hydrocarbons. The latter is operated with a hydrocarbon (2) and water vapour (3) for reforming. Heating is carried out with a fuel gas (4) and an oxygenous gas (5). The syngas obtained (6) is of a temperature of approx. 800° C. to 900° C. and is passed for cooling purposes through a heat exchanger (7) which heats a steam generator (7a) for boiler feed water (8). In this embodiment, the steam generator (7) for boiler feed water (8) is designed as a steam drum (7b). The syngas (6) subsequently flows into a high-temperature conversion unit (9) where water vapour ($H_2O$, 9a) is added to convert the carbon monoxide contained (CO) into carbon dioxide ($CO_2$) and hydrogen. The converted syngas (6) then flows into another heat exchanger (10) heating a steam generator (10a) for process condensate (11). In this embodiment the latter is also designed as a steam drum (10b). The process condensate (11) is obtained from the cooling section (12) for syngas (6a). The syngas (6a) which has cooled down while flowing through the heat exchangers (7,10) for the steam generators is passed through two further heat exchangers used as pre-heaters (13,14) for pre-heating the boiler feed water (8) and the process condensate (11). Leaving these heat exchangers (13,14) the syngas (6) reaches a cooling section (12) where the syngas (6a) cools down or is cooled down to allow condensation of the water contained (11a). The condensed water (11a) is further used as process condensate (11). At the outlet, the cooled dried syngas (6b) is obtained. The process condensate (11) is led through the flue gas duct (16) via a heat exchanger (15) to further heat the condensate. The steam drum (10b) for the process condensate (11) is also heated by the flue gas (17) via a heat exchanger (18). Steam (8a,11b) is obtained from boiler feed water (8) and process condensate (11).

Figure 2:
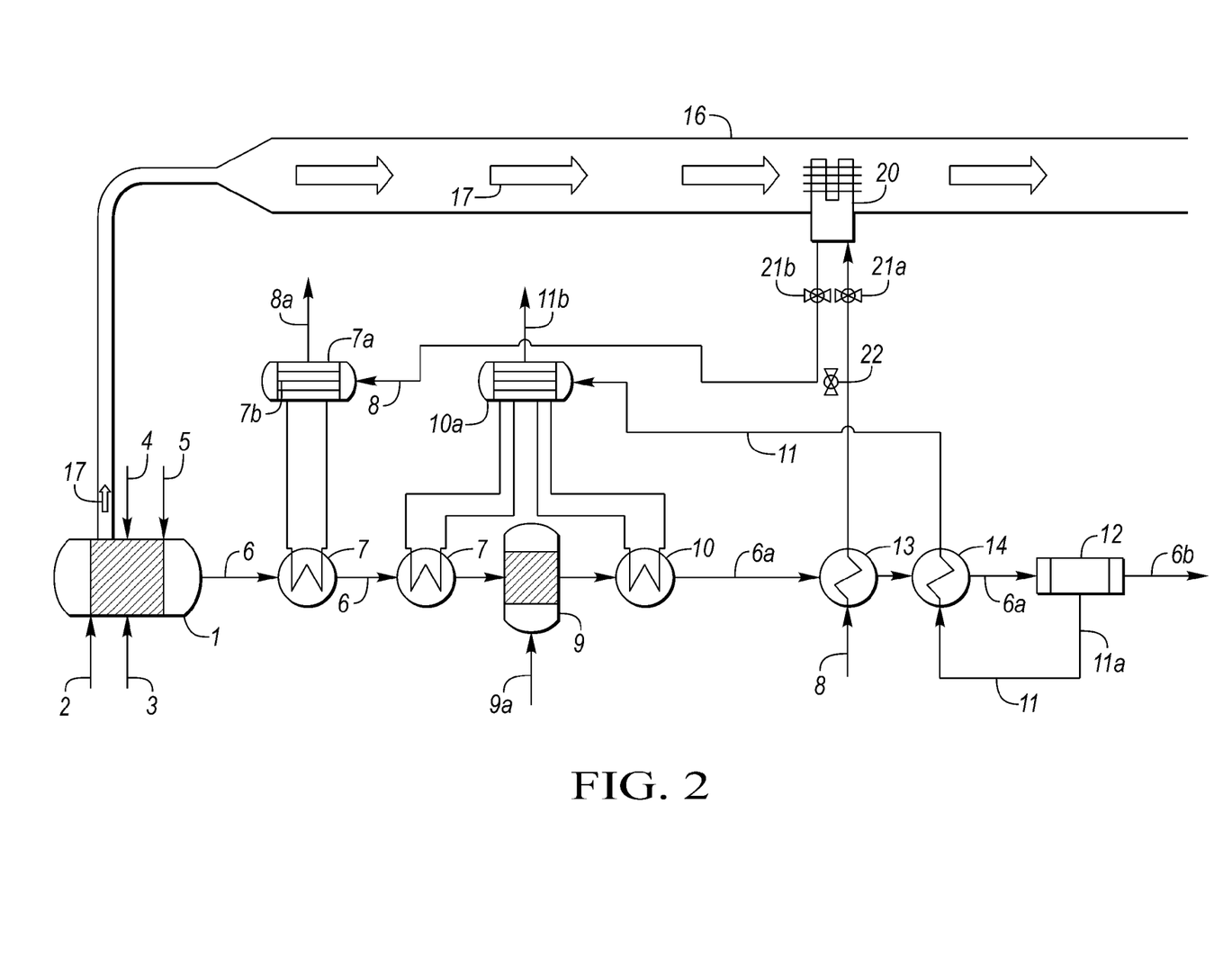
FIG. 2 shows an inventive plant with a process flow which represents only an exemplary embodiment to which the invention is not limited.

FIG. 2 shows an inventive contrivance which also includes a reforming reactor (1) which produces syngas (6) and conveys it to a high-temperature conversion unit (9). The heat of the produced syngas (6) is here as well exploited by the high-temperature conversion unit (9) for heating a steam generator (7a) via a heat exchanger (7) for boiler feed water (8). According to the present invention the heat of the syngas (6) upstream of the high-temperature conversion unit (9) is used for the process condensate (11) in addition to the heating by means of heat exchanger (19) of a steam generator (10a). After leaving the high-temperature conversion unit (9) the syngas is conveyed through a further heat exchanger (10) for heating the steam generator for process condensate (11) and two additional pre-heaters (13,14) which serve for pre-heating the boiler feed water (8) and the process condensate (11). The boiler feed water (8) can be used, whereby the boiler feed water (8) is heated by the flue gas (17) via a further heat exchanger (20) in the flue gas duct (16). This heat exchanger (20) can be shut off by valves (21a,21b) and by-passed by a by-pass valve (22) so that the heat exchanger (20) can be used as required by the demand of steam produced and by the utilisation of the reforming reactor (1). The heat exchangers for heating and evaporating the process condensate (10,19) can be designed as kettle reboilers. Syngas (6a) can also flow through the pre-heaters (13) and (14) in the inverse order.

Figure 3:
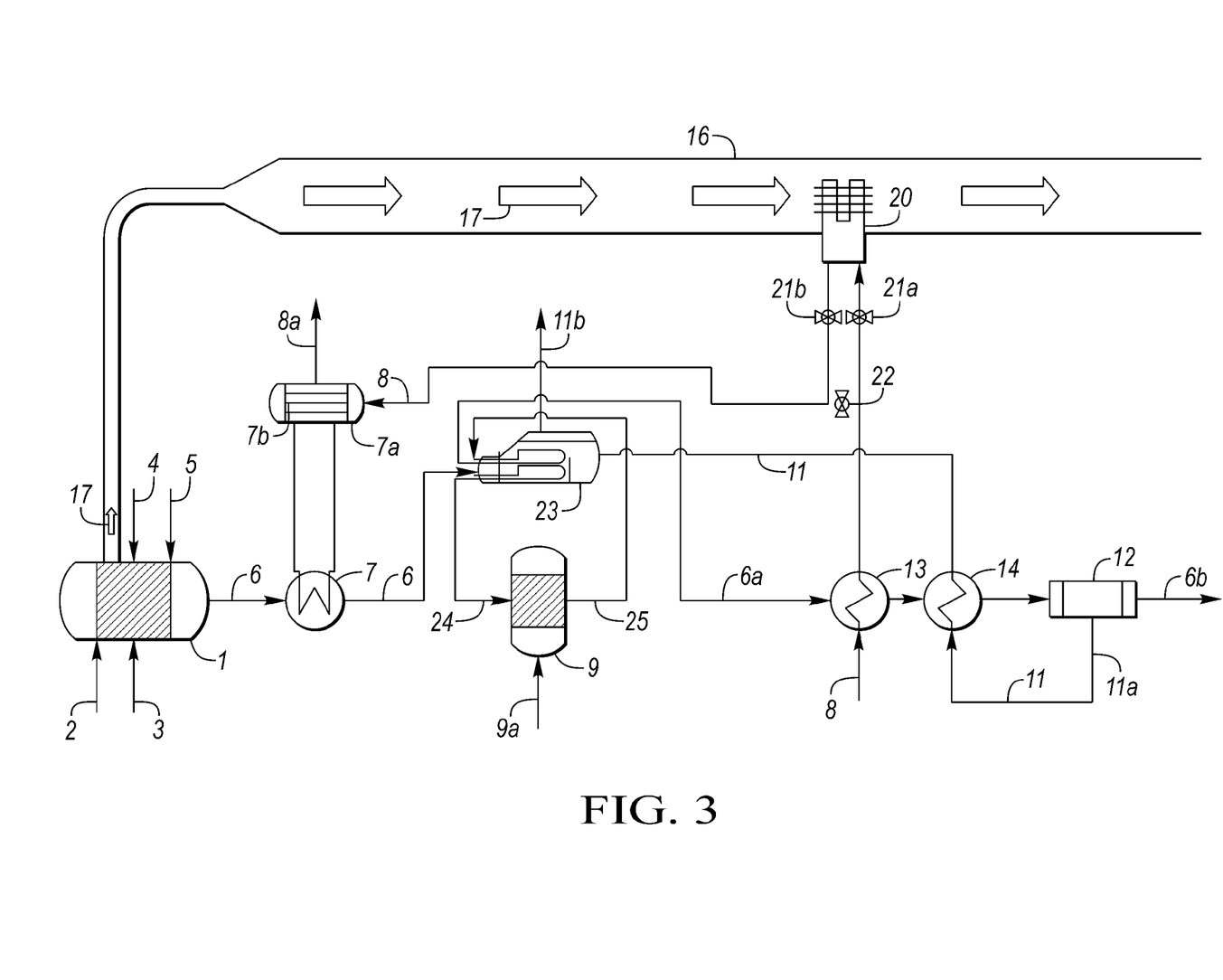
FIG. 3 shows the same embodiment where the steam generator and the heat exchanger for process condensate have been substituted by kettle reboilers.

FIG. 3 shows the same embodiment in which the steam generator (19) and the heat exchanger (10) with steam drum (10b) of FIG. 2 for the process condensate (11) have been substituted by a kettle reboiler (23). The syngas (6) which leaves the heat exchanger (7) for the boiler feed water (8) is passed to kettle reboiler (23) where it is heated and led via an inlet line (24) into the CO conversion unit (9). From there it is passed via an outlet line (25) through the same kettle reboiler (23) so that its temperature will then be as upstream of the CO conversion unit (9).

LIST OF DESIGNATIONS AND REFERENCE NUMBERS

1 Reforming reactor
2 Hydrocarbon
3 Water vapour
4 Fuel gas
5 Oxygenous gas
6 Syngas
6a Cooled syngas
6b Cooled and dried syngas
7 Heat exchanger for steam generator for boiler feed water
7a Steam generator for boiler feed water
7b Steam drum
8 Boiler feed water
8a Steam from boiler feed water
9 High-temperature conversion unit
9a Water vapour for CO conversion
10 Heat exchanger for steam generator for process condensate
10a Steam generator for process condensate
10b Steam drum
11 Process condensate
11a Condensed water from syngas
11b Steam from process condensate
12 Cooling section
13 Pre-heater for pre-heating boiler feed water
14 Pre-heater for pre-heating process condensate
15 Heat exchanger for heating process condensate in flue gas duct
16 Flue gas duct
17 Flue gas
18 Heat exchanger for heating steam generator for process condensate 19 Heat exchanger for heating process condensate upstream of high-temperature conversion unit
20 Heat exchanger in flue gas duct for heating boiler feed water
21a, 21b Valves for shutting off heat exchanger in flue gas duct
22 By-pass valve for heat exchanger in flue gas duct
23 Kettle reboiler
24 CO conversion inlet line
25 CO conversion outlet line

The invention claimed is:

1. A process for the generation of process steam and boiler feed water steam a heatable reforming reactor for the production of syngas, with
   the process yielding syngas by steam reforming from hydrocarbons and water vapour, the gas being heated by incinerating a fuel gas with an oxygenous gas, and the generated syngas being cooled and then condensed by a series of heat exchangers and a cooling section, so that a dried syngas and a process condensate are obtained,
   the process also including a conversion of at least part of the obtained carbon monoxide with water vapour to form carbon dioxide and hydrogen, and
   two different types of steam being made available, which are generated from the evaporation of boiler feed water and the evaporation of process condensate, and
   the boiler feed water being heated with the syngas by a pre-heater installed downstream of the conversion unit in direction of the gas flow, and the boiler feed water then being evaporated by a steam generator installed upstream of the conversion unit in direction of the gas flow, and
   the process condensate being heated by a heat exchanger and a pre-heater, both being installed downstream of the conversion unit in direction of the gas flow,
   wherein
   the process condensate is evaporated by an additional steam generator installed upstream of the conversion unit.

2. The process for the generation of process steam and boiler feed water steam in a heatable reforming reactor for the production of syngas according to claim 1, wherein the boiler feed water is heated permanently or temporarily by the flue gas via an additional heat exchanger.

3. The process for the generation of process steam and boiler feed water steam in a heatable reforming reactor for the production of syngas according to claim 1, wherein the steam yield from boiler feed water is controlled via a temperature control of the steam generator for boiler feed water.

4. The process for the generation of process steam and boiler feed water steam in a heatable reforming reactor for the production of syngas according to claim 1, wherein the steam generator for process condensate upstream of the CO conversion unit is a kettle boiler and the syngas flows through this kettle boiler.

5. The process for the generation of process steam and boiler feed water steam in a heatable reforming reactor for the production of syngas according to claim 1, wherein the heat exchanger for process condensate downstream of the CO conversion unit is a kettle boiler and the syngas flows through this kettle boiler.

6. An apparatus for the generation of process steam and boiler feed water steam in a heatable reforming reactor for the production of syngas, including
   a heatable reforming reactor for the production of syngas from hydrocarbons and water vapour,
   a conversion unit for converting carbon monoxide with water vapour into carbon dioxide,
   a cooling section for condensing process water,
   two pre-heaters for heating the boiler feed water and the process condensate with syngas,
   an additional heat exchanger for heating the process condensate with syngas, the heat exchanger being installed directly downstream of the conversion unit in direction of the syngas flow,
   a steam generator installed upstream of the conversion unit in direction of the syngas flow, this generator being used for the generation of steam from boiler feed water,
   wherein
   the apparatus comprises a steam generator installed upstream of the conversion unit in direction of the syngas flow, this generator being used to generate steam from process condensate.

7. The apparatus for the generation of process steam and boiler feed water steam in a heatable reforming reactor for the production of syngas according to claim 6, wherein the apparatus is equipped with an additional heat exchanger for heating boiler feed water in the flue gas duct.

8. The apparatus for the generation of process steam and boiler feed water steam in a heatable reforming reactor for the production of syngas according to claim 7, wherein the additional heat exchanger for heating boiler feed water in the flue gas duct can be shut off.

9. The apparatus for the generation of process steam and boiler feed water steam in a heatable reforming reactor for the production of syngas according to claim 6, wherein the syngas line is equipped with a kettle boiler upstream of the CO conversion unit.

10. The apparatus for the generation of process steam and boiler feed water steam in a heatable reforming reactor for the production of syngas according to claim 9, wherein the syngas line is provided with a kettle reboiler with heat exchanger coils which provide for a passage of the syngas upstream as well as downstream of the CO conversion unit in direction of the gas flow.

11. The apparatus for the generation of process steam and boiler feed water steam in a heatable reforming reactor for the production of syngas according to claim 6, wherein the syngas line is equipped with a kettle boiler downstream of the CO conversion unit.

12. The apparatus for the generation of process steam and boiler feed water steam in a heatable reforming reactor for the production of syngas according to claim 6, wherein the syngas line is equipped with a pipeline that can be shut off and allows controllable by-pass of the steam generator for the boiler feed water upstream of the CO conversion unit in direction of the gas flow.

13. The apparatus for the generation of process steam and boiler feed water steam in a heatable reforming reactor for the production of syngas according to claim 6, wherein the syngas line is equipped with a pipeline that can be shut off and allows controllable by-pass of the steam generator for the process condensate upstream of the CO conversion unit in direction of the gas flow.

14. The apparatus for the generation of process steam and boiler feed water steam in a heatable reforming reactor for the production of syngas according to claim 6, wherein a unit for low-temperature CO conversion is installed between the pre-heaters for the boiler feed water and the process condensate.

* * * * *

UNITED STATES PATENT AND TRADEMARK OFFICE
CERTIFICATE OF CORRECTION

| | | |
|---|---|---|
| PATENT NO. | : 8,904,970 B2 | Page 1 of 1 |
| APPLICATION NO. | : 13/821976 | |
| DATED | : December 9, 2014 | |
| INVENTOR(S) | : Thilo Von Trotha et al. | |

It is certified that error appears in the above-identified patent and that said Letters Patent is hereby corrected as shown below:

In the Claims

Column 9, Line 13, Claim 1:

After "feed water steam"
insert -- in --.

Signed and Sealed this
Thirty-first Day of March, 2015

Michelle K. Lee
*Director of the United States Patent and Trademark Office*